US012574501B2

(12) United States Patent
Zhang

(10) Patent No.: US 12,574,501 B2
(45) Date of Patent: Mar. 10, 2026

(54) METHOD, AND APPARATUS FOR REFERENCE FRAME SELECTION, ELECTRONIC DEVICE, AND STORAGE MEDIUM

(71) Applicant: Beijing Baidu Netcom Science Technology Co., Ltd., Beijing (CN)

(72) Inventor: Xu Zhang, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 22 days.

(21) Appl. No.: 18/749,192

(22) Filed: Jun. 20, 2024

(65) Prior Publication Data

US 2025/0142049 A1     May 1, 2025

(30) Foreign Application Priority Data

Oct. 26, 2023    (CN) .......................... 202311406959.0

(51) Int. Cl.
*H04N 19/105* (2014.01)
*H04N 19/172* (2014.01)
(52) U.S. Cl.
CPC ......... *H04N 19/105* (2014.11); *H04N 19/172* (2014.11)

(58) Field of Classification Search
CPC .. H04N 19/105; H04N 19/172; H04N 19/573; H04N 19/577; H04N 19/503; G06F 18/23
See application file for complete search history.

(56) References Cited

U.S. PATENT DOCUMENTS

| | | | |
|---|---|---|---|
| 12,244,818 B2 * | 3/2025 | Xu | H04N 19/139 |
| 2012/0328018 A1 * | 12/2012 | Lin | H04N 19/14 |
| | | | 375/E7.125 |
| 2018/0220152 A1 * | 8/2018 | Mukherjee | H04N 19/20 |
| 2023/0328233 A1 * | 10/2023 | Zhang | H04N 19/147 |

* cited by examiner

*Primary Examiner* — Francis Geroleo
(74) *Attorney, Agent, or Firm* — Banner & Witcoff, Ltd.

(57) ABSTRACT
A method for reference frame selection, an apparatus for reference frame selection, an electronic device and a storage medium are provided, which relates to the field of data processing technology, in particular to the fields of video coding technology and unsupervised learning technology. The method includes: acquiring a current frame to be processed and determining attribute information of the current frame; selecting candidate reference frames from a reference frame set according to the attribute information; clustering the selected candidate reference frames to obtain at least one cluster; and selecting one candidate reference frame from each of the at least one cluster and adding the one selected candidate reference frame from each of the at least one cluster to a reference frame list associated with the current frame. The technical solution herein provided can improve the accuracy of reference frame selection.

14 Claims, 4 Drawing Sheets

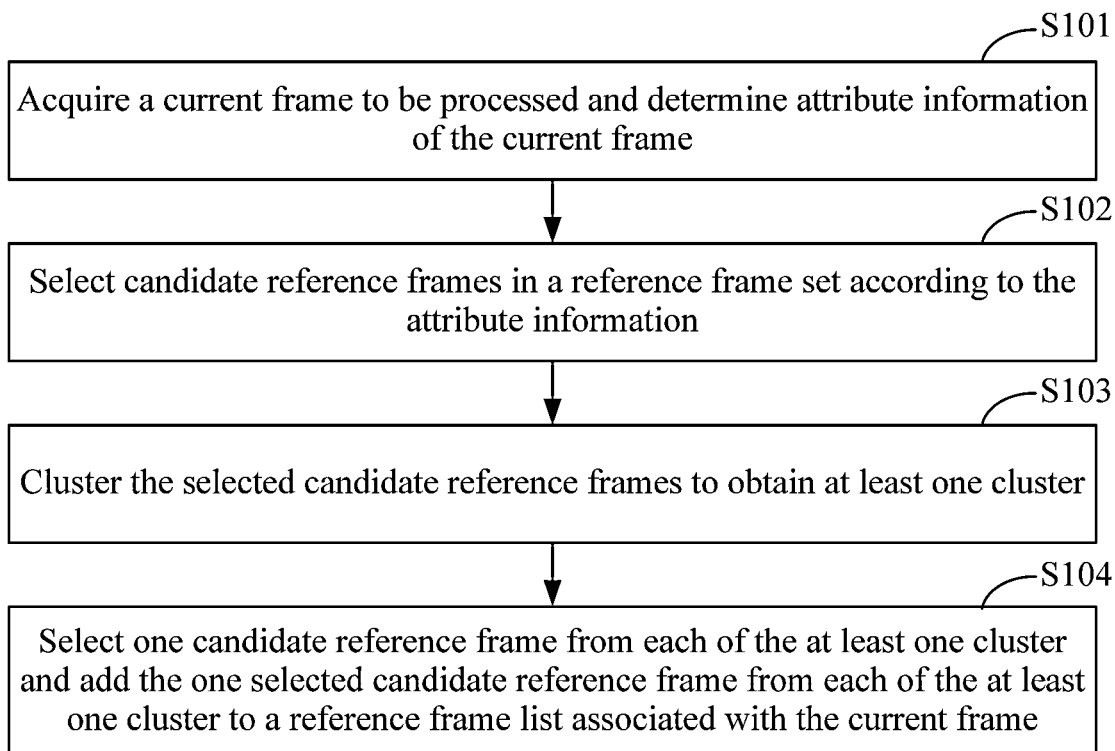

S101

Acquire a current frame to be processed and determine attribute information of the current frame

S102

Select candidate reference frames in a reference frame set according to the attribute information

S103

Cluster the selected candidate reference frames to obtain at least one cluster

S104

Select one candidate reference frame from each of the at least one cluster and add the one selected candidate reference frame from each of the at least one cluster to a reference frame list associated with the current frame

FIG. 1

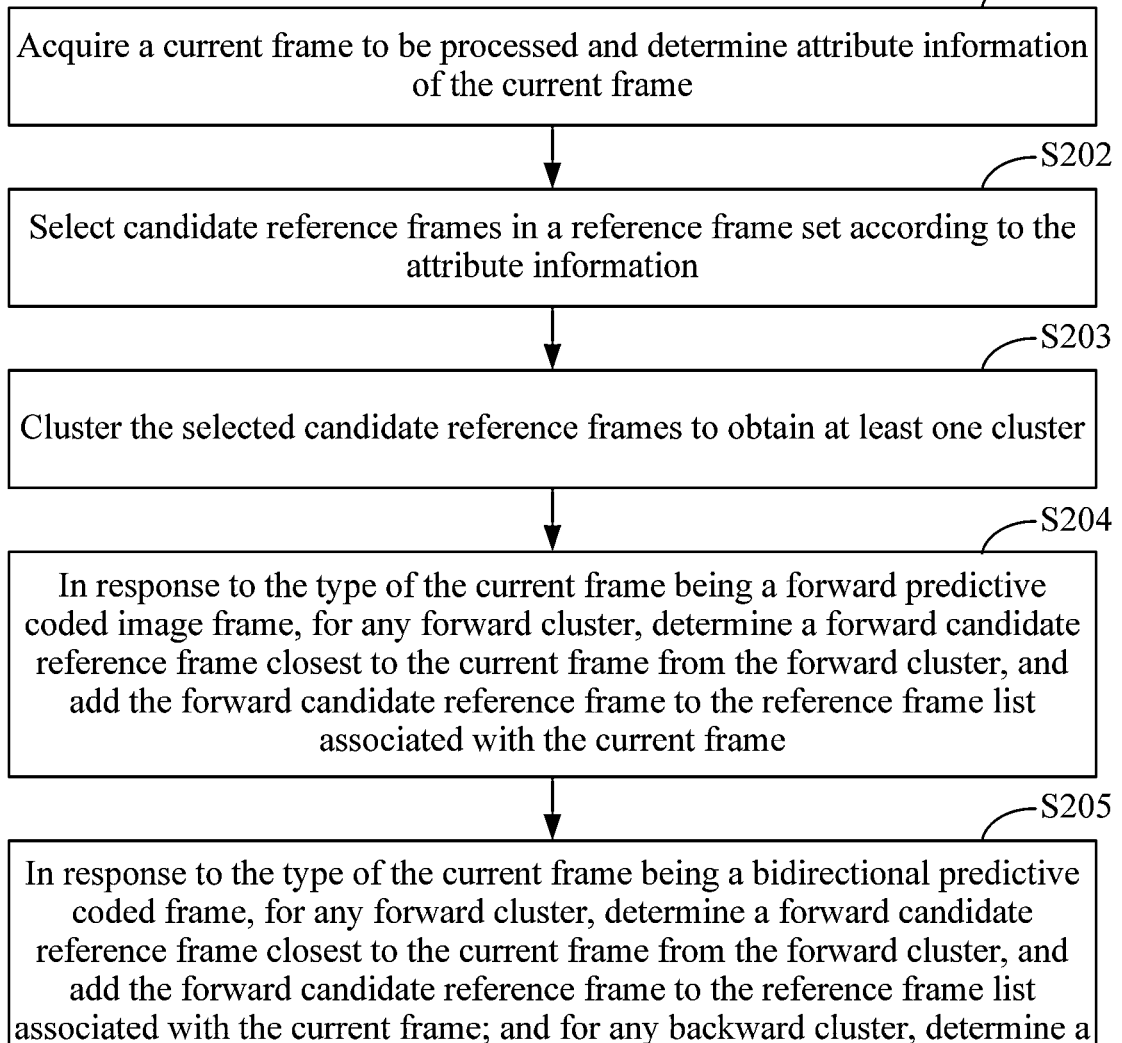

┌─ S201
Acquire a current frame to be processed and determine attribute information of the current frame ┌─ S202
Select candidate reference frames in a reference frame set according to the attribute information ┌─ S203
Cluster the selected candidate reference frames to obtain at least one cluster ┌─ S204
In response to the type of the current frame being a forward predictive coded image frame, for any forward cluster, determine a forward candidate reference frame closest to the current frame from the forward cluster, and add the forward candidate reference frame to the reference frame list associated with the current frame ┌─ S205
In response to the type of the current frame being a bidirectional predictive coded frame, for any forward cluster, determine a forward candidate reference frame closest to the current frame from the forward cluster, and add the forward candidate reference frame to the reference frame list associated with the current frame; and for any backward cluster, determine a backward candidate reference frame closest to the current frame from the backward cluster, and add the backward candidate reference frame to the reference frame list associated with the current frame

FIG. 2

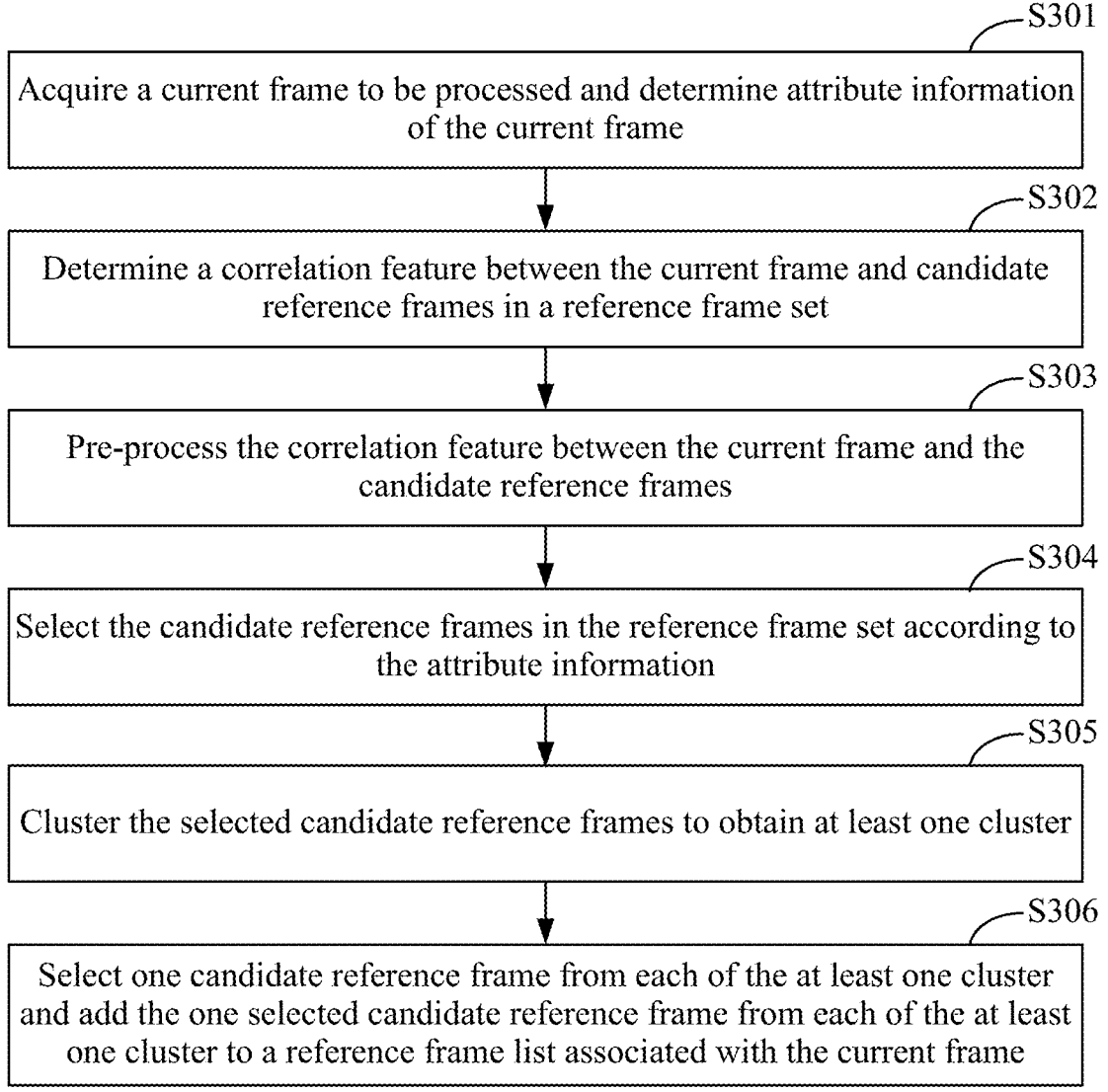

S301

Acquire a current frame to be processed and determine attribute information of the current frame

S302

Determine a correlation feature between the current frame and candidate reference frames in a reference frame set

S303

Pre-process the correlation feature between the current frame and the candidate reference frames

S304

Select the candidate reference frames in the reference frame set according to the attribute information

S305

Cluster the selected candidate reference frames to obtain at least one cluster

S306

Select one candidate reference frame from each of the at least one cluster and add the one selected candidate reference frame from each of the at least one cluster to a reference frame list associated with the current frame

FIG. 3

METHOD, AND APPARATUS FOR REFERENCE FRAME SELECTION, ELECTRONIC DEVICE, AND STORAGE MEDIUM

CROSS-REFERENCE TO RELATED APPLICATION

This application claims priority to Chinese Patent Application No. 202311406959.0 filed Oct. 26, 2023, the disclosure of which is incorporated herein by reference in its entirety.

TECHNICAL FIELD

This disclosure relates to the field of data processing technology, in particular to the fields of video coding technology and unsupervised learning technology, and specifically to a method for reference frame selection, an apparatus for reference frame selection, an electronic device, and a storage medium.

BACKGROUND

In current days, videos have become the most popular way of content consumption. In order to reduce transmission bandwidth and storage costs, video service providers usually use various video coding technologies to compress videos.

SUMMARY

A method for reference frame selection, an apparatus for reference frame selection, an electronic device, a storage medium and a computer program product are provided in the present disclosure.

According to one aspect of the present disclosure, a method for reference frame selection is provided, and the method includes the following:

a current frame to be processed is acquired, and attribute information of the current frame is determined.

candidate reference frames are selected from a reference frame set according to the attribute information.

the selected candidate reference frames are clustered to obtain at least one cluster; and one candidate reference frame is selected from each of the at least one cluster and is added to a reference frame list associated with the current frame.

According to another aspect of the present disclosure, an apparatus for reference frame selection is provided, and the apparatus includes a data acquisition module, a first selection module; a clustering module and a second selection module.

The data acquisition module is configured to acquire a current frame to be processed and determine attribute information of the current frame.

The first selection module is configured to select candidate reference frames from a reference frame set according to the attribute information.

The clustering module is configured to cluster the selected candidate reference frames to obtain at least one cluster.

The second selection module is configured to select one candidate reference frame from each of the at least one cluster and add the one selected candidate reference frame from each of the at least one cluster to a reference frame list associated with the current frame.

According to another aspect of the present disclosure, an electronic device is provided, and the electronic device includes the following:

at least one processor; and a memory communicatively connected to the at least one processor.

The memory stores an instruction executable by the at least one processor, and the instruction is executed by the at least one processor to enable the at least one processor to perform the method for reference frame selection described in any embodiment of the present disclosure.

According to another aspect of the present disclosure, a non-transitory computer-readable storage medium storing a computer instruction is provided. The computer instruction is configured to enable a computer to perform the method for reference frame selection described in any embodiment of the present disclosure.

According to another aspect of the present disclosure, a computer program product is provided, which includes a computer program, and the computer program, when being executed by a processor, implements the method for reference frame selection of any embodiment of the present disclosure.

According to the technical solution of the present disclosure, the accuracy of reference frame selection can be improved.

It should be understood that the content described in this section is not intended to identify key or important features of the embodiments of the present disclosure, nor is it intended to limit the scope of the present disclosure. Other features of the present disclosure will become readily understood from the following description.

BRIEF DESCRIPTION OF DRAWINGS

The accompanying drawings are used to better understand the technical solution and do not constitute a limitation of the present disclosure.

FIG. 1 is a schematic flow chart of a method for reference frame selection according to an embodiment of the present disclosure;

FIG. 2 is another schematic flow chart of a method for reference frame selection according to an embodiment of the present disclosure;

FIG. 3 is another schematic flow chart of a method for reference frame selection according to an embodiment of the present disclosure;

DETAILED DESCRIPTION

Figure 4:
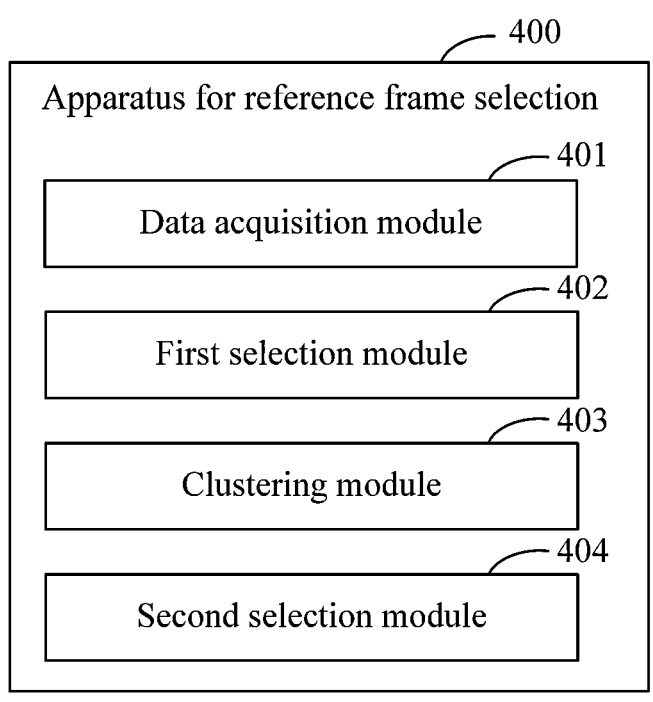
FIG. 4 is a schematic diagram of the structure of an apparatus for reference frame selection according to an embodiment of the present disclosure.

Exemplary embodiments of the present disclosure are described hereinafter in conjunction with the accompanying drawings, the description includes various details of the embodiments of the present disclosure to facilitate understanding, but they should be considered as merely exemplary. Accordingly, the person of ordinary skill in the art should recognize that various changes and modifications can be made for the embodiments described herein without departing from the scope and spirit of the present disclosure.

Also, in the following description, descriptions of well-known functions and structures are omitted for clarity and conciseness.

The disclosed solution is applicable to scenarios where video sequence data is coded using high-efficiency video coding (HEVC) technology. Compared with other coding technologies, HEVC technology can not only ensure coding quality but also significantly reduce bit rate. When HEVC technology is used for video coding, it is necessary to select an appropriate reference frame for the to-be-coded video frame, so as to perform motion estimation on the to-be-coded video frame based on the appropriate reference frame, and then perform corresponding coding according to the motion estimation result. The reference frame refers to the video frame that has been coded. In an optional implementation, the reference frames may be managed in a linked list manner, and when a new reference frame is generated, the newly generated reference frame is added to the header of the linked list. In selecting appropriate reference frames for the to-be-coded video frame from the linked list later, for example, the number of required reference frames is first determined, and then a sufficient number of reference frames are selected backward starting from the header of the linked list. However, this method has certain shortcomings: because each new reference frame is added to the header, the reference frames finally selected for the to-be-coded video frame are all relatively close to the to-be-coded video frame, and reference frames that are slightly farther away cannot be selected, making it impossible for the final motion estimation to obtain the optimal result. Based on this, in the technical solution of the present disclosure, a new method for reference frame selection is proposed, and the specific process of the method can be found in the following embodiment.

FIG. 1 is a schematic diagram of a method for reference frame selection according to an embodiment of the present disclosure. This embodiment is applicable to a scenario of coding video data. The method can be performed by an apparatus for reference frame selection, and the apparatus is implemented in software and/or hardware and configured in an electronic device.

As shown in FIG. 1, the method specifically includes the following steps: S101 to S104.

In S101, a current frame to be processed is acquired, and attribute information of the current frame is determined.

The technical solution of this embodiment is applicable to the scenario of video coding, so the current frame to be processed can be any single video frame in the video sequence to be coded. After acquiring the current frame, the attribute information of the current frame can be determined. The attribute information may include the type of the current frame and display order parameter of the current frame. The type may optionally include a forward predictive coded frame (i.e., a P frame) and a bidirectional predictive coded frame (i.e., a B frame); and the display order parameter is used to characterize the order in which the current frame is displayed in the video sequence, and optionally, the display order parameter may be the frame number of the current frame.

In S102, candidate reference frames are selected from a reference frame set according to the attribute information.

In this embodiment, a reference frame set includes a number of candidate reference frames, and in order to ensure the accuracy in coding the current frame, it is necessary to select appropriate candidate reference frames for the current frame from the reference frame set. In an optional implementation, when the type of the current frame is a forward predictive coded frame, when performing motion estimation on the current frame, it is only necessary to refer to the candidate reference frames that are displayed before the current frame. Therefore, for the case where the type of the current frame is the forward predictive coded frame, candidate forward reference frames that are displayed before the current frame are selected from the reference frame set according to the display order parameter. During implementation, a sliding window technique may be used to select candidate forward reference frames. For example, a fixed window may be set that can move according to a preset step size and select one candidate reference frame that is displayed before the current frame in display order at each position as a candidate forward reference frame.

When the type of the current frame is a bidirectional predictive coded frame, in performing motion estimation on the current frame, it is necessary to refer to both the candidate reference frames that are displayed before the current frame and the candidate reference frames that are displayed after the current frame. Therefore, for the case where the type of the current frame is the bidirectional predictive coded frame, candidate forward reference frames that are displayed before the current frame and candidate backward reference frames that are displayed after the current frame can be selected from the reference frame set according to the display order parameter of the current frame. During implementation, a sliding window technique may be used to select candidate forward reference frames and candidate backward reference frames from a reference frame set.

It is to be noted that, selecting candidate reference frames from a reference frame set according to the attribute information is actually dividing the reference frame set into a forward reference frame set including candidate forward reference frames and a backward reference frame set including candidate backward reference frames. Moreover, selecting the reference frame set according to the attribute information of the current frame is essentially a rough selection of the reference frame set to select candidate reference frames that may be suitable for the current frame, and is the basis for subsequent selection of appropriate candidate reference frames through clustering.

In S103, the selected candidate reference frames are clustered to obtain at least one cluster.

In this embodiment, in response to the type of the current frame being the forward predictive coded image frame, the candidate forward reference frames selected in step S102 are clustered to obtain at least one forward cluster. A forward cluster of the at least one forward cluster may include at least one candidate forward reference frame.

In response to the type of the current frame being the bidirectional predictive coded frame, selected candidate forward reference frames are clustered to obtain at least one forward cluster; where any forward cluster of the at least one forward cluster may include at least one candidate forward reference frame; and selected candidate backward reference frames are clustered to obtain at least one backward cluster; where any backward cluster of the at least one backward cluster may include at least one candidate backward reference frame.

It is to be noted that any clustering method can be adopted in this embodiment, which is not specifically limited here. Moreover, different clustering objects are selected for different types of current frames, which provides a guarantee for the subsequent selection of candidate reference frame suitable for the current frame.

In S104, one candidate reference frame is selected from each of the at least one cluster and added to a reference frame list associated with the current frame.

Optionally, for the case where the type of the current frame is the forward predictive coded frame, one candidate forward reference frame can be selected from each forward cluster. The selection can be random or according to a preset selection strategy, which is not specifically limited here; the selected candidate forward reference frame is added to a reference frame list associated with the current frame; where the reference frame list is used to store the reference frames required for motion estimation of the current frame.

For the case where the type of the current frame is a bidirectional predictive coded frame, one candidate forward reference frame can be selected from each forward cluster, and one candidate backward reference frame can be selected from each backward cluster, and the candidate forward reference frame and candidate backward reference frame selected from the two clusters can be added to a reference frame list associated with the current frame.

The technical solution in the present disclosure can also be carried out according to the following process: according to the display order parameter of the current frame, candidate reference frames are selected from a reference frame set to determine the candidate forward reference frames and the candidate backward reference frames therein; the candidate forward reference frames are clustered to obtain multiple forward clusters, and one candidate forward reference frame is selected from each forward cluster and added to the reference frame list associated with the current frame; according to the type of the current frame, it is determined whether the current frame is a bidirectional predictive coded frame; if not, a reference frame list is output to perform motion estimation based on the candidate forward reference frames in the reference frame list; if yes, the candidate backward reference frames are clustered to obtain multiple backward clusters, and one candidate backward reference frame is selected from each backward cluster and added to the reference frame list associated with the current frame, and then a reference frame list including both the candidate forward reference frames and the candidate backward reference frames is output.

With the technical solution of this embodiment, candidate reference frames with more different characteristics from the current frame can be selected, so that it is easier to select corresponding matched blocks for the current frame during motion estimation, and solves the problem that better matched blocks cannot be searched in many cases because the characteristics of the reference frames are similar due to the concentration of reference frames. Furthermore, through the technical solution in the present disclosure, the selection of reference frames can be made more accurate, thereby ensuring video coding performance and using less bandwidth.

FIG. 2 is another schematic flow chart of a method for reference frame selection according to an embodiment of the present disclosure. As shown in FIG. 2, the method for reference frame selection specifically includes the following steps: S201 to S204.

In S201, a current frame to be processed is acquired, and attribute information of the current frame is determined.

The attribute information may include the type of the current frame and display order parameter of the current frame. The type may optionally include a forward predictive coded frame (i.e., a P frame) and a bidirectional predictive coded frame (i.e., a B frame); and the display order parameter is used to represent the order in which the current frame is displayed in the video sequence, and optionally, the display order parameter may be the frame number of the current frame.

In S202, candidate reference frames are selected from a reference frame set according to the attribute information.

Optionally, in response to the type of the current frame being the forward predictive coded frame, candidate forward reference frames that are displayed before the current frame are selected from the reference frame set according to the display order parameter; in response to the type of the current frame being the bidirectional predictive coded frame, candidate forward reference frames that are displayed before the current frame and candidate backward reference frames that are displayed after the current frame can be selected from the reference frame set according to the display order parameter of the current frame.

In S203, the selected candidate reference frames are clustered to obtain at least one cluster.

Optionally, in response to the type of the current frame being the forward predictive coded image frame, selected candidate forward reference frames are clustered to obtain at least one forward cluster; and in response to the type of the current frame being the bidirectional predictive coded frame, selected candidate forward reference frames are clustered to obtain at least one forward cluster; and selected candidate backward reference frames are clustered to obtain at least one backward cluster.

In this embodiment, the details of selecting one candidate reference frame from each of the at least one cluster and adding the one selected candidate reference frame to the reference frame list associated with the current frame can be referred to steps S204 to S205.

In S204, in response to the type of the current frame being the forward predictive coded image frame, for any forward cluster of the at least one forward cluster, a candidate forward reference frame closest to the current frame is determined from the forward cluster, and the candidate forward reference frame is added to the reference frame list associated with the current frame.

In S205, in response to the type of the current frame being the bidirectional predictive coded frame, for any forward cluster of the at least one forward cluster, a candidate forward reference frame closest to the current frame is determined from the forward cluster, and the candidate forward reference frame is added to the reference frame list associated with the current frame; and for a backward cluster of the at least one backward cluster, a candidate backward reference frame closest to the current frame is determined from the backward cluster, and the candidate backward reference frame is added to the reference frame list associated with the current frame.

Optionally, for any forward cluster of the at least one forward cluster, the distance between each of at least one candidate forward reference frame in the forward cluster and the current frame is determined based on a display order parameter of each of the at least one candidate forward reference frame in the forward cluster and the display order parameter of the current frame. For example, for any candidate forward reference frame in the cluster, the absolute value of the difference between the display order parameter of the candidate forward reference frame and the display order parameter of the current frame is used as the distance between the candidate forward reference frame and the current frame. According to the distance between each of the at least one candidate forward reference frame in the forward cluster and the current frame, a candidate forward reference frame closest to the current frame is selected. In this way, the candidate reference frame that best suits the current frame can be selected from each forward cluster.

Optionally, for any backward cluster of the at least one backward cluster, the distance between each of at least one candidate backward reference frame in the backward cluster and the current frame is determined based on the display order parameter of each of the at least one candidate backward reference frame in the backward cluster and the display order parameter of the current frame; for example, for any candidate backward reference frame in the cluster, the absolute value of the difference between the display order parameter of the candidate backward reference frame and the display order parameter of the current frame is used as the distance between the candidate backward reference frame and the current frame. According to the distance between each of the at least one candidate backward reference frame in the backward cluster and the current frame, a candidate backward reference frame closest to the current frame is selected. In this way, the candidate reference frame that best suits the current frame can be selected from each backward cluster.

In this embodiment, after completing the clustering of candidate reference frames, one candidate reference frame closest to the current frame is selected from each of the at least one cluster according to the distances between the current frame and the at least one candidate reference frame in each of the at least one cluster, thereby further selecting the candidate reference frames and ensuring the accuracy of the selecting candidate reference frames.

FIG. 3 is another schematic flow chart of a method for reference frame selection according to an embodiment of the present disclosure. As shown in FIG. 3, the method specifically includes the following steps: S301 to S305.

In S301, a current frame to be processed is acquired, and attribute information of the current frame is determined.

In this embodiment, the attribute information may include the type and display order parameter of the current frame. The type may optionally include a forward predictive coded frame (i.e., a P frame) and a bidirectional predictive coded frame (i.e., a B frame); and the display order parameter is used to characterize the order in which the current frame is displayed in the video sequence, and optionally, the display order parameter may be the frame number of the current frame.

In S302, a correlation feature between the current frame and candidate reference frames from a reference frame set are determined.

Optionally, candidate reference frames from a reference frame set are compared with the current frame to determine a correlation feature. The correlation feature includes at least one of the number of inter-frame blocks, the number of intra-frame blocks, intra-frame coding loss, image quality quantization parameters, image brightness mean, and brightness variance of the candidate reference frames. It is to be noted that by selecting these features, the accuracy of subsequent clustering can be guaranteed.

In S303, the correlation feature between the current frame and the candidate reference frames are pre-processed.

The pre-processing includes standardization processing and normalization processing. Through standardization processing and normalization processing, the correlation feature can be converted into a normal distribution form, thereby eliminating the influence of dimensions or values on subsequent clustering results.

In S304, the candidate reference frames are selected from a reference frame set according to the attribute information.

Optionally, in response to the type of the current frame being the forward predictive coded frame, candidate forward reference frames that are displayed before the current frame are selected from the reference frame set according to the display order parameter; and in response to the type of the current frame being the bidirectional predictive coded frame, candidate forward reference frames that are displayed before the current frame and candidate backward reference frames that are displayed after the current frame can be selected from the reference frame set according to the display order parameter of the current frame.

In S305, the selected candidate reference frames are clustered to obtain at least one cluster.

Optionally, in response to the type of the current frame being the forward predictive coded image frame, selected candidate forward reference frames are clustered to obtain at least one forward cluster; and in response to the type of the current frame being the bidirectional predictive coded frame, selected candidate forward reference frames are clustered to obtain at least one forward cluster; and selected candidate backward reference frames are clustered to obtain at least one backward cluster.

In an optional implementation, the clustering the selected candidate forward reference frames to obtain at least one forward cluster may be implemented as follows.

A first number of candidate forward reference frames required for predetermined clustering is acquired. The first number may be preset. The candidate forward reference frames are clustered, according to a correlation feature between the current frame and the candidate forward reference frames, the first number and a preset clustering algorithm, to obtain at least one forward cluster. The preset clustering algorithm is the K-means clustering algorithm of unsupervised learning. The specific clustering process is as follows. In step 1, the number of clusters K is determined, where the value of K can be equal to the first number. In step 2, cluster centers are initialized: for each category, one candidate forward reference frame is selected as an initial cluster center for that category. These centers can be selected randomly or by using some heuristics. In step 3, candidate forward reference frames are assigned to various categories: the distance between each candidate forward reference frame and each of the at least one cluster center is calculated, and assign each candidate forward reference frame to the category where the nearest cluster center is located, where the distance is the Euclidean distance between the correlation feature of a candidate forward reference frame and the correlation feature of a cluster center. In step 4, the cluster centers are recalculated, and the new position of each cluster center is obtained by calculating the average position of all candidate forward reference frames in each cluster. Steps 3 and 4 are repeated till the cluster center no longer changes significantly or the preset number of iterations is reached, and the clustering result is outputted, that is, the category to which each reference frame belongs and the cluster center to which each reference frame corresponds are outputted.

In an optional implementation, the clustering the selected candidate backward reference frames to obtain at least one backward cluster may be implemented as follows.

A second number of candidate backward reference frames required for predetermined clustering is acquired; where the second number may be preset; the candidate backward reference frames are clustered, according to the correlation feature between the current frame and the candidate backward reference frames, the second number and a preset clustering algorithm, to obtain at least one backward cluster. The preset clustering algorithm is the K-means clustering algorithm of unsupervised learning. The clustering process is similar to the clustering process of candidate forward reference frames described above, which is not repeated herein.

It is to be noted that when the first number is greater than or equal to the number of candidate forward reference frames in the forward reference frame set, all candidate forward reference frames in the forward reference frame set are directly added to the reference frame list of the current frame without clustering. Similarly, when the second number is greater than or equal to the number of candidate backward reference frames in the backward reference frame set, all candidate backward reference frames in the backward reference frame set are directly added to the reference frame list of the current frame without clustering. In this case, coding time is further saved.

In S306, one candidate reference frame is selected from each of the at least one cluster and is added to a reference frame list associated with the current frame.

Optionally, in response to the type of the current frame being the forward predictive coded image frame, for any forward cluster of the at least one forward cluster, a candidate forward reference frame closest to the current frame is determined from the forward cluster, and the candidate forward reference frame is added to a reference frame list associated with the current frame; and in response to the type of the current frame being the bidirectional predictive coded frame, for any forward cluster of the at least one forward cluster, a candidate forward reference frame closest to the current frame is determined from the forward cluster, and the candidate forward reference frame is added to a reference frame list associated with the current frame; and for any backward cluster of the at least one backward cluster, a candidate backward reference frame closest to the current frame is determined from the backward cluster, and the candidate backward reference frame is added to the reference frame list associated with the current frame.

In this embodiment, the correlation feature between the current frame and the candidate reference frames are determined, and are pre-processed, which ensures the accuracy of subsequent reference frame clustering; the k-means clustering algorithm of unsupervised learning is used, which, compared with traditional methods such as empirical formula and experimental fitting curve, can more quickly select reference frames that meet the requirements.

FIG. 4 is a schematic diagram of the structure of an apparatus for reference frame selection according to an embodiment of the present disclosure. This embodiment is applicable to a scenario of coding video data. The apparatus can implement the method for reference frame selection described in any embodiment of the present disclosure. As shown in FIG. 4, the apparatus 400 specifically includes: a data acquisition module 401; a first selection module 402; a clustering module 403 and a second selection module 404.

The data acquisition module 401 is configured to acquire a current frame to be processed and determine attribute information of the current frame.

The first selection module 402 is configured to select candidate reference frames from a reference frame set according to the attribute information.

The clustering module 403 is configured to cluster the selected candidate reference frames to obtain at least one cluster.

The second selection module 404 is configured to select one candidate reference frame from each of the at least one cluster and add the one selected candidate reference frame from each of the at least one cluster to a reference frame list associated with the current frame.

In an optional implementation, the attribute information includes the type of the current frame and display order parameter of the current frame.

The first selection module includes: a first selection unit and a second selection unit.

The first selection unit is configured to, in response to the type of the current frame being a forward predictive coded image frame, select, according to the display order parameter, candidate forward reference frames that are displayed before the current frame from the reference frame set.

The second selection unit is configured to, in response to the current frame being a bidirectional predictive coded frame, select, according to the display order parameter, candidate forward reference frames that are displayed before the current frame and candidate backward reference frames that are displayed after the current frame from the reference frame set.

In an optional implementation, the clustering module includes: a first clustering unit and a second clustering unit.

The first clustering unit is configured to, in response to the type of the current frame being the forward predictive coded image frame, cluster selected candidate forward reference frames to obtain at least one forward cluster.

The second clustering unit is configured to, in response to the type of the current frame being the bidirectional predictive coded frame, cluster selected candidate forward reference frames to obtain at least one forward cluster, and cluster selected candidate backward reference frames to obtain at least one backward cluster.

In an optional implementation, the second selection module includes: a third selection unit and a fourth selection unit.

The third selection unit is configured to, in response to the type of the current frame being the forward predictive coded image frame, for any forward cluster of the at least one forward cluster, determine a candidate forward reference frame closest to the current frame from the forward cluster, and add the candidate forward reference frame to the reference frame list associated with the current frame.

The fourth selection unit is configured to, in response to the type of the current frame being the bidirectional predictive coded frame, for any forward cluster of the at least one forward cluster, determine a candidate forward reference frame closest to the current frame from the forward cluster, and add the candidate forward reference frame to the reference frame list associated with the current frame; and for any backward cluster of the at least one backward cluster, determine a candidate backward reference frame closest to the current frame from the backward cluster, and add the candidate backward reference frame to the reference frame list associated with the current frame.

In an optional implementation, the method further includes: a feature selection module and a feature processing module.

The feature selection module is configured to determine a correlation feature between the current frame and candidate reference frames from a reference frame set.

The feature processing module is configured to pre-process the correlation feature between the current frame and the candidate reference frames, where the pre-processing includes standardization processing and normalization processing.

In an optional implementation, the first clustering unit is further configured to:

acquire a first number of candidate forward reference frames required for predetermined clustering; and cluster the candidate forward reference frames, according to the correlation feature between the current frame and the candidate forward reference frames, the first number and a preset clustering algorithm, to obtain at least one forward cluster.

In an optional implementation, the second clustering unit is further configured to:

acquire a second number of candidate backward reference frames required for predetermined clustering; and cluster the candidate backward reference frames, according to the correlation feature between the current frame and the candidate backward reference frames, the second number and a preset clustering algorithm, to obtain at least one backward cluster.

In an optional implementation, the third selection unit is further configured to:

for a forward cluster of the at least one forward cluster, determine a distance between each candidate forward reference frame in the forward cluster and the current frame based on a display order parameter of each candidate forward reference frame in the forward cluster and the display order parameter of the current frame; and according to the distance, select a candidate forward reference frame closest to the current frame.

In an optional implementation, the fourth selection unit is further configured to:

for any backward cluster of the at least one backward cluster, determine a distance between each candidate backward reference frame in the backward cluster and the current frame based on a display order parameter of each candidate backward reference frame in the backward cluster and the display order parameter of the current frame; and according to the distance, select a candidate backward reference frame closest to the current frame.

In an optional implementation, the preset clustering algorithm is the K-means clustering algorithm.

The above-described product can perform the method provided by any embodiment of the present disclosure, and has the corresponding functional modules for performing the method and can achieve beneficial effects corresponding to those achieved by performing the method.

In the technical solution of the present disclosure, all the processes such as collection, storage, use, processing, transmission, provision and disclosure of user personal information involved are in compliance with the provisions of relevant laws and regulations and do not violate public order and good morals.

According to an embodiment of the present disclosure, an electronic device, a readable storage medium, and a computer program product are further provided according to the present disclosure.

Figure 5:
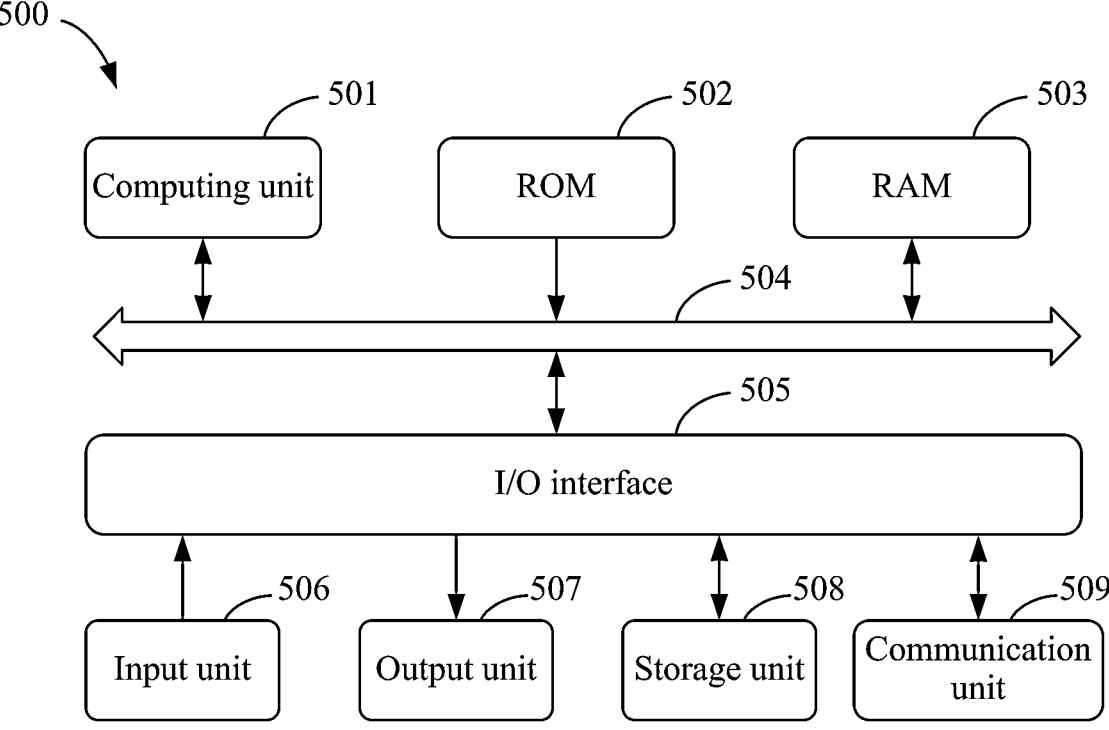
FIG. 5 is a block diagram of an electronic device for implementing the method for reference frame selection according to an embodiment of the present disclosure.

FIG. 5 shows a schematic structural diagram of an exemplary electronic device 500 that can be used to implement an embodiment of the present disclosure. It is intended to use electronic device to represent various forms of digital computers, such as laptops, desktops, workstations, personal digital assistants, servers, blade servers, mainframes, and other suitable computers. Electronic devices 10 may further represent various forms of mobile apparatuses, such as personal digital processing, cellular phones, smart phones, wearable devices, and other similar computing devices. The components shown herein, their connections and relationships, and their functions, are used as examples only, and are not intended to limit implementations of the disclosure described and/or claimed herein.

As shown in FIG. 5, the electronic device 500 includes a computing unit 501. The computing unit 501 can perform various appropriate actions and processes according to a computer program stored in a read only memory (ROM) 502 or a computer program loaded from a storage unit 508 into a random access memory (RAM) 503. In the RAM 503, various programs and data necessary for the operation of the electronic device 500 may further be stored. The computing unit 501, ROM 502, and RAM 503 are connected to each other through a bus 504. An input/output (I/O) interface 505 is also connected to the bus 504.

Multiple components in the electronic device 500 are connected to the I/O interface 505, including: an input unit 506, such as a keyboard, a mouse, etc.; an output unit 507, such as various types of displays, speakers, etc.; a storage unit 508, such as a magnetic disk, an optical disk etc.; and a communication unit 509, such as a network card, a modem, a wireless communication transceiver, and the like. The communication unit 509 allows the electronic device 500 to exchange information/data with other devices through a computer network such as the Internet and/or various telecommunication networks.

The computing unit 501 may be various general and/or special purpose processing components having processing and computing capabilities. Some examples of the computing unit 501 include, but are not limited to, a central processing unit (CPU), a graphics processing unit (GPU), various dedicated artificial intelligence (AI) computing chips, various computing units that run machine learning model algorithms, digital signal processing processors (DSP), and any appropriate processor, controller, microcontroller, etc. The computing unit 501 performs the various methods and processes described above, such as the method for reference frame selection. For example, in some embodiments, the method for reference frame selection can be implemented as a computer software program, which is tangibly contained in a machine-readable medium, for example, a storage unit 508. In some embodiments, part or all of the computer program may be loaded and/or installed on the electronic device 500 via the ROM 502 and/or the communication unit 509. When the computer program is loaded into the RAM 503 and performed by the computing unit 501, one or more steps of the method for reference frame selection described above can be performed. Optionally, in other embodiments, the computing unit 501 may be configured in any other appropriate way (for example, by means of firmware) to perform the method for reference frame selection.

Various implementations of the system and technique described above herein can be implemented in a digital electronic circuit system, an integrated circuit system, a field programmable gate array (FPGA), an application specific integrated circuit (ASIC), application specific standard parts (ASSPs), a system on chip (SOC), a complex programmable logic device (CPLD), a computer hardware, firmware, software, and/or combinations thereof. These various embodiments may include being implemented in one or more computer programs which can be performed and/or interpreted on a programmable system including at least one programmable processor, the programmable processor can be a special-purpose or general-purpose programmable processor, can receive data and instruction from storage system, at least one input device, and at least one output device, and transmit data and instruction to the storage system, the at least one input device, and the at least one output device.

The program codes for implementing the method of the present disclosure may be written in one programming language or any combination of more programming languages. These program codes can be provided to a processor or controller of a general-purpose computer, a special-purpose computer or other programmable data processing apparatus, so that the program codes, when being performed by the processor or controller, cause the functions/operations specified in the flowchart and/or block diagram to be implemented. The program codes may be performed entirely on the machine, partly on the machine, partly on the machine and partly on a remote machine as a stand-alone software package, or entirely on a remote machine or remote server.

In the context of the present disclosure, a machine readable medium may be a tangible medium that may contain or store a program for use by an instruction execution system, apparatus or device or use in conjunction with an instruction execution system, apparatus or device. A machine readable medium may be a machine readable signal medium or a machine readable storage medium. The machine readable medium may include, but is not limited to, an electronic, magnetic, optical, electromagnetic, infrared, or semiconductor system, apparatus, or device, or any appropriate combination of the foregoing. More specific examples of machine-readable storage media would include one or more wire-based electrical connected or portable computer discs, hard drives, RAM, ROM, erasable programmable read-only memory (EPROM) or flash memory, optical fiber, compact disk read-only memory (CD-ROM), optical storage, magnetic storage, or any appropriate combination of the foregoing.

In order to provide interaction with the user, the systems and techniques described herein can be implemented on a computer having a display device (e.g., a cathode ray tube (CRT) monitor or liquid crystal display (LCD) monitor) configured to display information to the user; and a keyboard and a pointing device (e.g., a mouse or a trackball) through which the user can provide input to the computer. Other kinds of devices can also be configured to provide interaction with the user; for example, the feedback provided to the user can be any form of sensory feedback (e.g., visual feedback, auditory feedback, or tactile feedback); and can be in any form (including acoustic input, speech input or, tactile input) to receive input from the user.

The systems and techniques described herein can be implemented in a computing system that includes back-end components (e.g., as a data server), or a computing system that includes middleware components (e.g., an application server), or a computing system that includes front-end components (e.g., a user computer having a graphical user interface or web browser through which a user can interact with embodiments of the system and technique described herein), or be implemented in a computing system including any combination of such backend components, middleware components, or front-end components. The components of the system can be interconnected by any form or medium of digital data communication, (e.g., a communication network). Examples of communication network include: local area networks (LANs), wide area network (WAN), blockchain network, and the Internet.

A computer system can include a client and a server. The client and the server are generally remote from each other and typically interact through a communication network. The relationship of the client and the server arises by computer programs running on the respective computers and having a client-server relationship to each other. The server can be a cloud server, also known as a cloud computing server or a cloud host, and is a host product in the cloud computing service system to overcome the drawbacks of difficult management and weak business expansion in traditional physical hosts and virtual private servers VPSs. The server can also be a server of a distributed system, or a server combined with a blockchain.

Artificial intelligence is a discipline that studies how to use computers to simulate certain human thought processes and intelligent behaviors (such as learning, reasoning, thinking, planning, etc.). It involves both hardware-level and software-level technologies. Artificial intelligence hardware technologies generally include technologies such as sensors, dedicated artificial intelligence chips, cloud computing, distributed storage, and big data processing; artificial intelligence software technologies mainly include computer vision technology, speech recognition technology, natural language processing technology, machine learning/deep learning technology, big data processing technology, knowledge graph technology, and other major directions.

Cloud computing refers to a technology system that uses network to access to elastically scalable shared physical or virtual resource pools. Resources may include servers, operating systems, networks, software, applications, and storage devices, and can be deployed and managed on-demand in a self-service manner. Through cloud computing technology, efficient and powerful data processing capabilities can be provided for technical applications such as artificial intelligence and blockchain, and model training.

It should be understood that various forms of the processes shown above may be used, with steps reordered, added or deleted. For example, the steps described in the present disclosure may be executed in parallel, sequentially, or in different orders, as long as the expected results of the technical solutions provided by the present disclosure can be achieved, and this document does not impose any limitations thereon.

The above specific implementations do not constitute limitations on the protection scope of the present disclosure. It should be apparent to the person skilled in the art that various modifications, combinations, sub-combinations and substitutions may be made depending on design requirements and other factors. Any modifications, equivalent substitutions and improvements made within the spirit and principles of this disclosure should be included in the protection scope of this disclosure.

What is claimed is:

1. A method for reference frame selection, comprising:
    acquiring a current frame to be processed and determining attribute information of the current frame;
    selecting candidate reference frames from a reference frame set according to the attribute information;
    clustering the selected candidate reference frames to obtain at least one cluster; and
    selecting one candidate reference frame from each of the at least one cluster and adding the one selected candidate reference frame from each of the at least one cluster to a reference frame list associated with the current frame;
    wherein the attribute information comprises a type of the current frame and a display order parameter of the current frame;
    wherein the selecting candidate reference frames from a reference frame set according to the attribute information comprises:
        in response to the type of the current frame being a forward predictive coded frame, selecting, according to the display order parameter, candidate forward reference frames displayed before the current frame from the reference frame set; and

in response to the type of the current frame being a
bidirectional predictive coded frame, selecting,
according to the display order parameter, candidate
forward reference frames displayed before the cur-
rent frame and candidate backward reference frames
displayed after the current frame from the reference
frame set;
wherein the clustering the selected candidate reference
frames to obtain at least one cluster comprises:
in response to the type of the current frame being the
forward predictive coded image frame, clustering the
selected candidate forward reference frames to
obtain at least one forward cluster; and
in response to the type of the current frame being the
bidirectional predictive coded frame, clustering the
selected candidate forward reference frames to
obtain at least one forward cluster, and clustering the
selected candidate backward reference frames to
obtain at least one backward cluster; and
wherein the selecting one candidate reference frame from
each of the at least one cluster and adding the one
selected candidate reference frame to a reference frame
list associated with the current frame comprises:
in response to the type of the current frame being the
forward predictive coded image frame, for a forward
cluster of the at least one forward cluster, determin-
ing a candidate forward reference frame closest to
the current frame from the forward cluster, and
adding the candidate forward reference frame to the
reference frame list associated with the current
frame; and
in response to the type of the current frame being the
bidirectional predictive coded frame, for a forward
cluster of the at least one forward cluster, determin-
ing a candidate forward reference frame closest to
the current frame from the forward cluster, and
adding the candidate forward reference frame to the
reference frame list associated with the current
frame; and for a backward cluster of the at least one
backward cluster, determining a candidate backward
reference frame closest to the current frame from the
backward cluster, and adding the candidate back-
ward reference frame to the reference frame list
associated with the current frame.
2. The method according to claim 1, further comprising:
determining a correlation feature between the current
frame and candidate reference frames from a reference
frame set; and
pre-processing the correlation feature between the current
frame and the candidate reference frames, wherein the
pre-processing comprises standardization processing
and normalization processing.
3. The method according to claim 2, wherein the cluster-
ing the selected candidate forward reference frames to
obtain at least one forward cluster comprises:
acquiring a first number of candidate forward reference
frames required for predetermined clustering; and
clustering the candidate forward reference frames,
according to the correlation feature between the current
frame and the candidate forward reference frames, the
first number and a preset clustering algorithm, to obtain
the at least one forward cluster.
4. The method according to claim 2, wherein the cluster-
ing the selected candidate backward reference frames to
obtain at least one backward cluster comprises:
acquiring a second number of candidate backward refer-
ence frames required for predetermined clustering; and

clustering the candidate backward reference frames,
according to the correlation feature between the current
frame and the candidate backward reference frames,
the second number and a preset clustering algorithm, to
obtain the at least one backward cluster.
5. The method according to claim 1, wherein the deter-
mining a candidate forward reference frame closest to the
current frame from the forward cluster comprises:
for a forward cluster of the at least one forward cluster,
determining a distance between each of at least one
candidate forward reference frame in the forward clus-
ter and the current frame based on a display order
parameter of each of the at least one candidate forward
reference frame in the forward cluster and the display
order parameter of the current frame; and
according to the distance between each of the at least one
candidate forward reference frame in the forward clus-
ter and the current frame, selecting the candidate for-
ward reference frame closest to the current frame.
6. The method according to claim 1, wherein the deter-
mining a candidate backward reference frame closest to the
current frame from the backward cluster comprises:
for a backward cluster of the at least one backward cluster,
determining a distance between each of at least one
candidate backward reference frame in the backward
cluster and the current frame based on a display order
parameter of each of the at least one candidate back-
ward reference frame in the backward cluster and the
display order parameter of the current frame; and
according to the distance between each of the at least one
candidate backward reference frame in the backward
cluster and the current frame, selecting the candidate
backward reference frame closest to the current frame.
7. The method according to claim 3, wherein the preset
clustering algorithm is a K-means clustering algorithm.
8. An electronic device, comprising:
at least one processor; and
a memory communicatively connected to the at least one
processor;
wherein the memory stores an instruction executable by
the at least one processor, and the instruction is
executed by the at least one processor to enable the at
least one processor to perform:
acquiring a current frame to be processed and determining
attribute information of the current frame;
selecting candidate reference frames from a reference
frame set according to the attribute information;
clustering the selected candidate reference frames to
obtain at least one cluster; and
selecting one candidate reference frame from each of the
at least one cluster and adding the one selected candi-
date reference frame to a reference frame list associated
with the current frame;
wherein the attribute information comprises a type of the
current frame and a display order parameter of the
current frame;
wherein the selecting candidate reference frames from a
reference frame set according to the attribute informa-
tion comprises:
in response to the type of the current frame being a
forward predictive coded frame, selecting, according
to the display order parameter, candidate forward
reference frames displayed before the current frame
from the reference frame set; and
in response to the type of the current frame being a
bidirectional predictive coded frame, selecting,
according to the display order parameter, candidate forward reference frames displayed before the current frame and candidate backward reference frames displayed after the current frame from the reference frame set;

wherein the clustering the selected candidate reference frames to obtain at least one cluster comprises:

in response to the type of the current frame being the forward predictive coded image frame, clustering the selected candidate forward reference frames to obtain at least one forward cluster; and in response to the type of the current frame being the bidirectional predictive coded frame, clustering the selected candidate forward reference frames to obtain at least one forward cluster, and clustering the selected candidate backward reference frames to obtain at least one backward cluster; and wherein the selecting one candidate reference frame from each of the at least one cluster and adding the one selected candidate reference frame to a reference frame list associated with the current frame comprises:

in response to the type of the current frame being the forward predictive coded image frame, for a forward cluster of the at least one forward cluster, determining a candidate forward reference frame closest to the current frame from the forward cluster, and adding the candidate forward reference frame to the reference frame list associated with the current frame; and in response to the type of the current frame being the bidirectional predictive coded frame, for a forward cluster of the at least one forward cluster, determining a candidate forward reference frame closest to the current frame from the forward cluster, and adding the candidate forward reference frame to the reference frame list associated with the current frame; and for a backward cluster of the at least one backward cluster, determining a candidate backward reference frame closest to the current frame from the backward cluster, and adding the candidate backward reference frame to the reference frame list associated with the current frame.

9. The electronic device according to claim 8, further comprising:

determining a correlation feature between the current frame and candidate reference frames from a reference frame set; and pre-processing the correlation feature between the current frame and the candidate reference frames, wherein the pre-processing comprises standardization processing and normalization processing.

10. The electronic device according to claim 9, wherein the clustering the selected candidate forward reference frames to obtain at least one forward cluster comprises:

acquiring a first number of candidate forward reference frames required for predetermined clustering; and clustering the candidate forward reference frames, according to the correlation feature between the current frame and the candidate forward reference frames, the first number and a preset clustering algorithm, to obtain the at least one forward cluster.

11. The electronic device according to claim 9, wherein the clustering the selected candidate backward reference frames to obtain at least one backward cluster comprises:

acquiring a second number of candidate backward reference frames required for predetermined clustering; and clustering the candidate backward reference frames, according to the correlation feature between the current frame and the candidate backward reference frames, the second number and a preset clustering algorithm, to obtain the at least one backward cluster.

12. The electronic device according to claim 8, wherein the determining a candidate forward reference frame closest to the current frame from the forward cluster comprises:

for a forward cluster of the at least one forward cluster, determining a distance between each of at least one candidate forward reference frame in the forward cluster and the current frame based on a display order parameter of each of the at least one candidate forward reference frame in the forward cluster and the display order parameter of the current frame; and according to the distance between each of the at least one candidate forward reference frame in the forward cluster and the current frame, selecting the candidate forward reference frame closest to the current frame.

13. The electronic device according to claim 8, wherein the determining a candidate backward reference frame closest to the current frame from the backward cluster comprises:

for a backward cluster of the at least one backward cluster, determining a distance between each of at least one candidate backward reference frame in the backward cluster and the current frame based on a display order parameter of each of the at least one candidate backward reference frame in the backward cluster and the display order parameter of the current frame; and according to the distance between each of the at least one candidate backward reference frame in the backward cluster and the current frame, selecting the candidate backward reference frame closest to the current frame.

14. A non-transitory computer-readable storage medium storing a computer instruction, wherein the computer instruction is configured to cause a computer to perform:

acquiring a current frame to be processed and determining attribute information of the current frame;

selecting candidate reference frames from a reference frame set according to the attribute information;

clustering the selected candidate reference frames to obtain at least one cluster; and selecting one candidate reference frame from each of the at least one cluster and adding the one selected candidate reference frame to a reference frame list associated with the current frame;

wherein the attribute information comprises a type of the current frame and a display order parameter of the current frame;

wherein the selecting candidate reference frames from a reference frame set according to the attribute information comprises:

in response to the type of the current frame being a forward predictive coded frame, selecting, according to the display order parameter, candidate forward reference frames displayed before the current frame from the reference frame set; and in response to the type of the current frame being a bidirectional predictive coded frame, selecting, according to the display order parameter, candidate forward reference frames displayed before the current frame and candidate backward reference frames displayed after the current frame from the reference frame set;

wherein the clustering the selected candidate reference frames to obtain at least one cluster comprises:

in response to the type of the current frame being the forward predictive coded image frame, clustering the selected candidate forward reference frames to obtain at least one forward cluster; and in response to the type of the current frame being the bidirectional predictive coded frame, clustering the selected candidate forward reference frames to obtain at least one forward cluster, and clustering the selected candidate backward reference frames to obtain at least one backward cluster; and wherein the selecting one candidate reference frame from each of the at least one cluster and adding the one selected candidate reference frame to a reference frame list associated with the current frame comprises:

in response to the type of the current frame being the forward predictive coded image frame, for a forward cluster of the at least one forward cluster, determining a candidate forward reference frame closest to the current frame from the forward cluster, and adding the candidate forward reference frame to the reference frame list associated with the current frame; and in response to the type of the current frame being the bidirectional predictive coded frame, for a forward cluster of the at least one forward cluster, determining a candidate forward reference frame closest to the current frame from the forward cluster, and adding the candidate forward reference frame to the reference frame list associated with the current frame; and for a backward cluster of the at least one backward cluster, determining a candidate backward reference frame closest to the current frame from the backward cluster, and adding the candidate backward reference frame to the reference frame list associated with the current frame.

* * * * *